April 21, 1936.  T. M. EYNON  2,038,273
GAUGE
Filed June 13, 1935  3 Sheets-Sheet 1
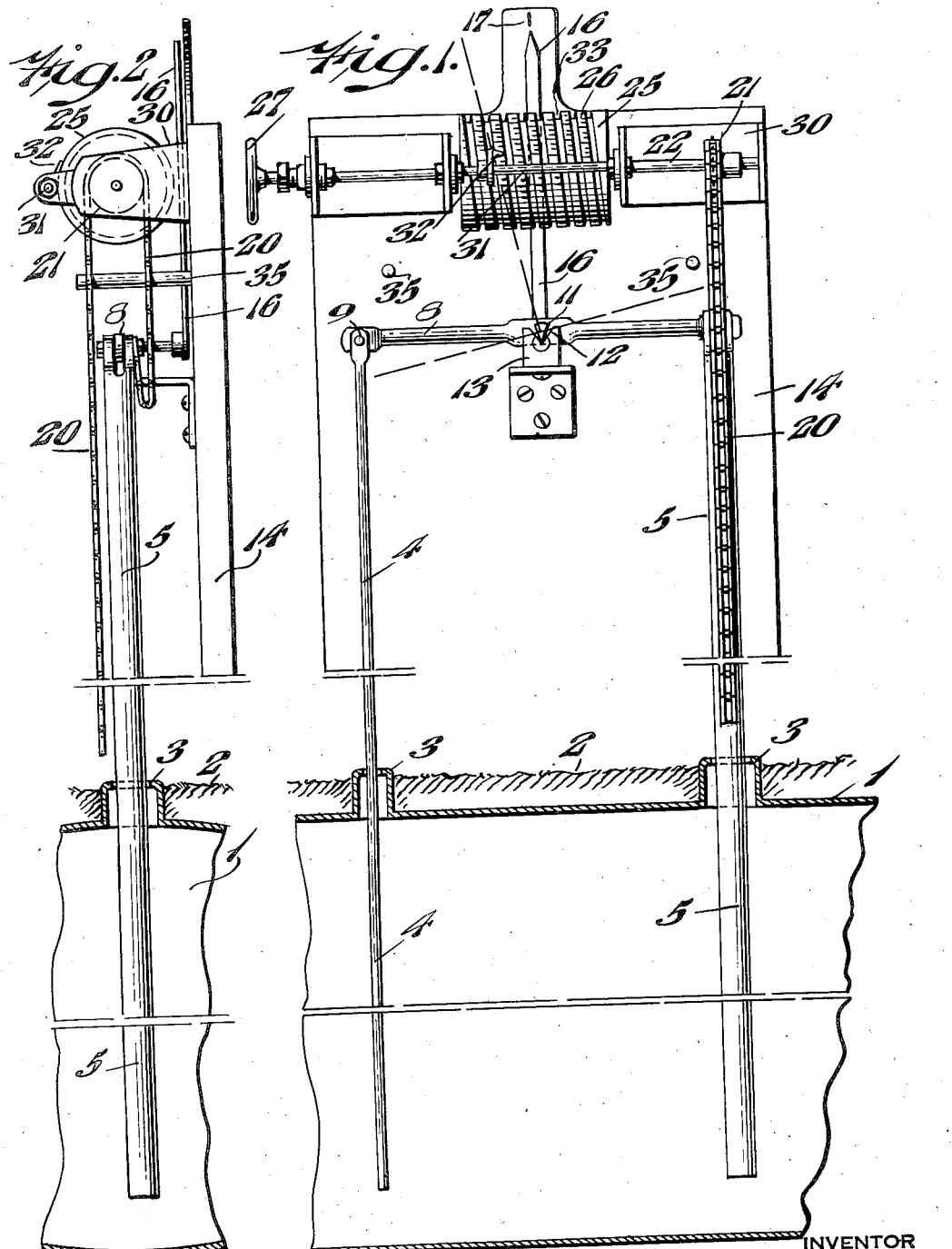
INVENTOR
THOMAS M. EYNON,
BY
ATTORNEY

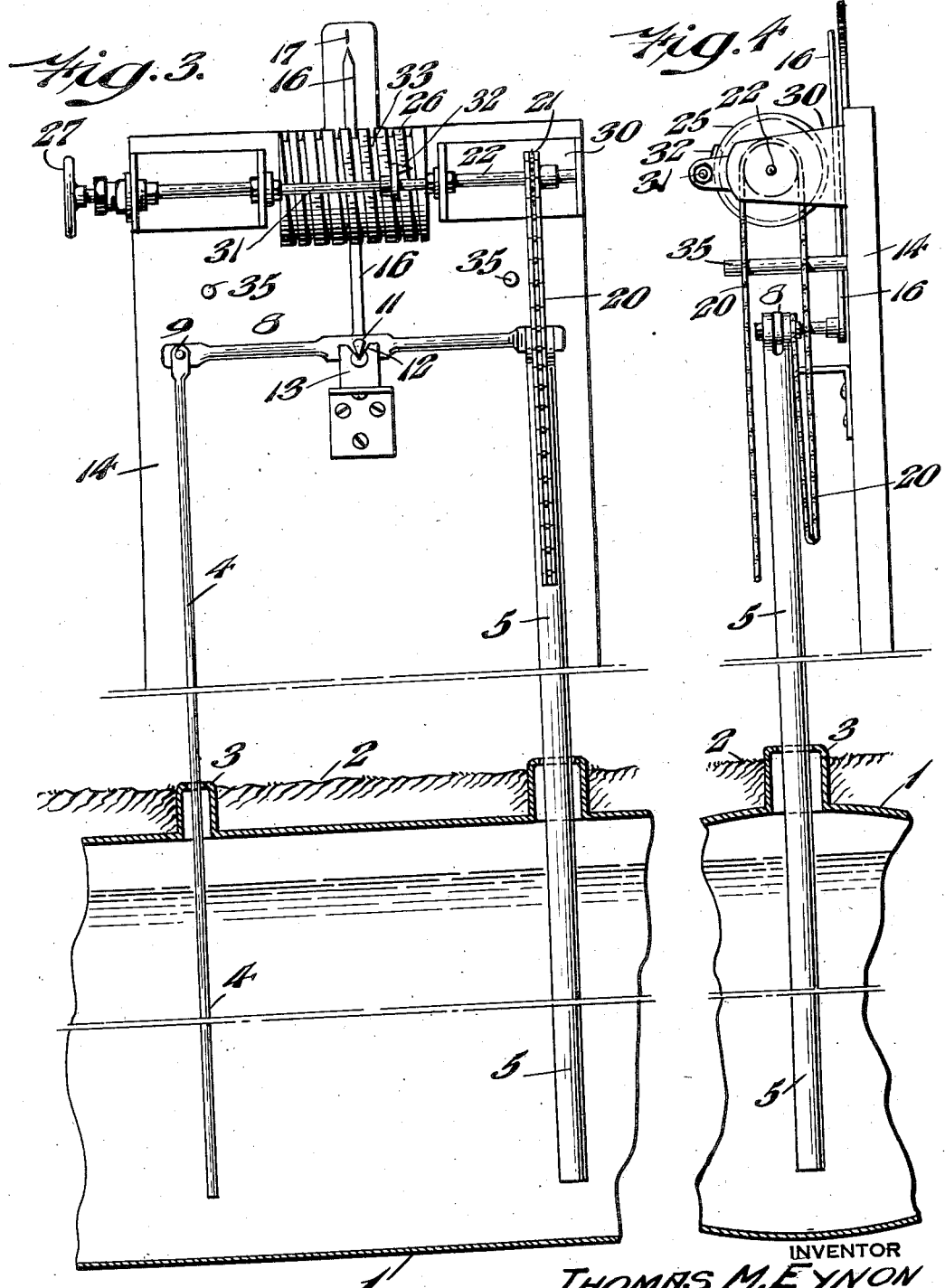

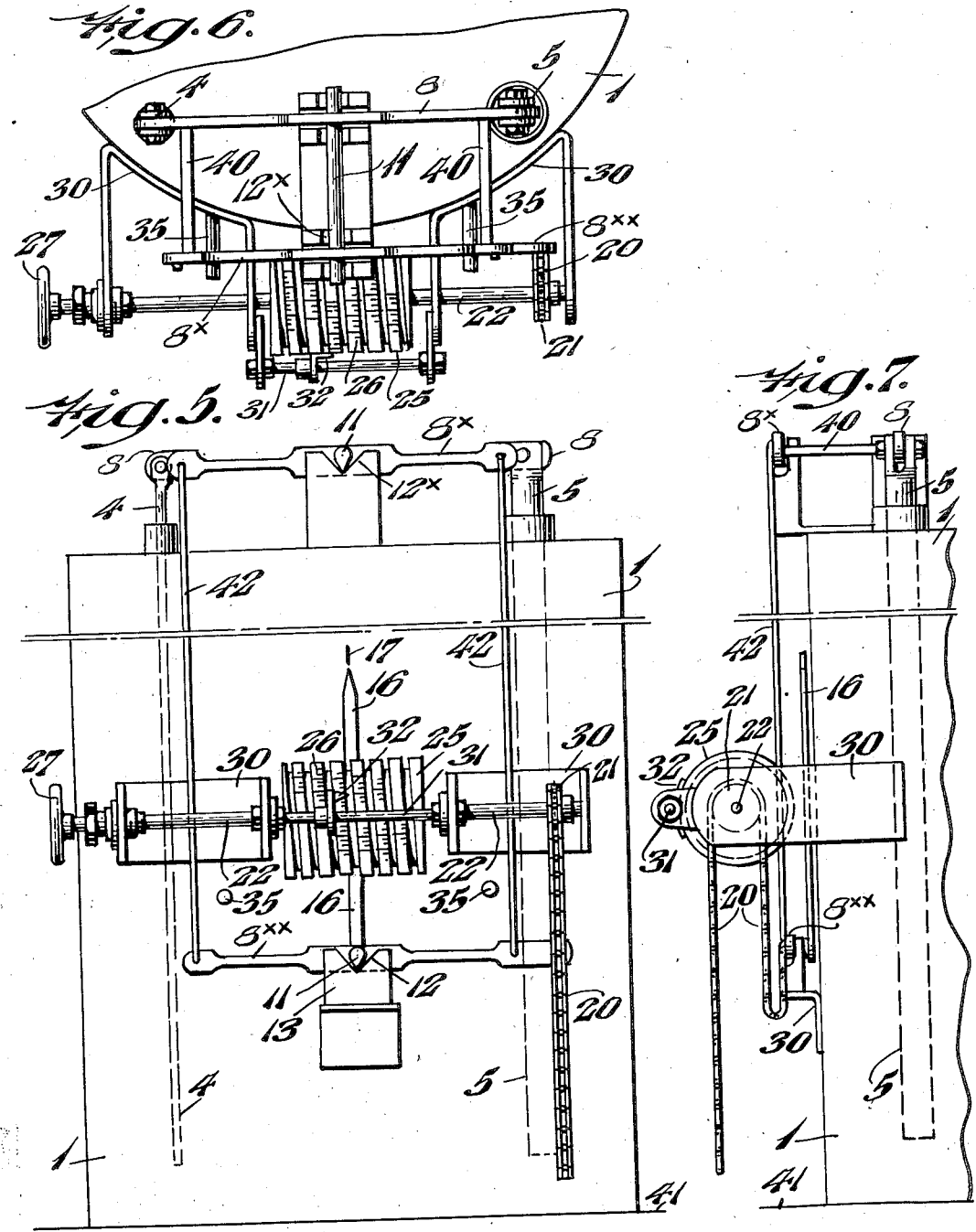

Patented Apr. 21, 1936

2,038,273

UNITED STATES PATENT OFFICE 2,038,273

GAUGE

Thomas M. Eynon, Philadelphia, Pa.

Application June 13, 1935, Serial No. 26,384

4 Claims. (Cl. 73—82)

My invention relates to a new and useful gauge adapted for the measurement of the liquid contents of a tank or other receptacle and it relates more particularly to a gauge in which the liquid contents of the tank are measured indirectly by measuring the different buoyancies exerted by the liquid in the tank upon two floats having the same weight but having different volumetric displacements as distinguished from a direct measurement depending upon the buoyancy exerted by the liquid in the tank against a single float or other displacing object.

My invention still further relates to a gauge of this character whereby very large volumes of liquid can be measured by measuring the potential differential in buoyancy, thus enabling my gauge to operate within an extremely limited range of movement as distinguished from the relatively wide range of movement necessary in the case of a single float which must rise and fall in direct proportion to the rise and fall of the level of the liquid to be measured.

My invention still further relates to a gauge which after being calibrated to the particular tank in connection with which it is to be used, can be permanently applied to said tank to give a reading or indication of the liquid contents of the tank at any desired time in terms of height of the liquid within the tank or in terms of volumetric units.

My invention still further relates to a gauge of this character which, in addition to giving constant, accurate measurement, is also built of relatively simple parts which do not get out of order and which can remain in service indefinitely without the necessity of replacement or repair.

My invention still further relates to a gauge of this character which is capable of being adjusted to compensate for inequalities or inaccuracies which frequently occur in the manufacture of the tank or of the component parts of the gauge itself as made or as affected by use over a period of time.

My invention still further relates to various other novel features of construction and advantage which will be more clearly set forth in connection with the accompanying drawings in which:

Fig. 1 represents a view in front elevation of a gauge embodying my invention shown applied to an empty underground tank.

Fig. 2 represents a view in side elevation of Fig. 1.

Fig. 3 represents a view similar to Fig. 1 showing the gauge applied to a partly filled tank.

Fig. 4 represents a side elevation of Fig. 3.

Fig. 5 represents a diagrammatic view in front elevation of my novel gauge as applied to an over ground tank.

Fig. 6 represents a fragmentary plan view of Fig. 5.

Fig. 7 represents a side elevation of Fig. 5.

Referring to the drawings in which like reference characters indicate like parts, I designates a tank or receptacle which may be an underground tank as shown in the drawings, with the ground level indicated at 2, or it might be a large storage tank of the type generally employed by oil companies and which extend considerably above the ground in the well-known manner. The tank is provided with the necks 3 through which the floats 4 and 5 are adapted to pass to extend into the tank as shown in Fig. 1. The floats 4 and 5 are exactly of the same weight but one of the floats 5 is of a much greater cross section than the other float 4, it being understood that both floats would be either solid and made of materials having different specific gravities or, if they are made hollow, they are closed at the bottom. The floats 4 and 5 extend above the top of the tank and above the ground level and are connected at their upper ends to the balance lever 8 as at 9. The balance lever 8 is carried by a knife-edge stub shaft 11 which balances in the V slot 12 in the bracket 13 which in turn is suitably secured to any desired support 14. Carried by the knife-edge stub shaft 11 is the pointer 16 which, when the floats 4 and 5 are exactly balanced, (so that the balance lever 8 is perfectly horizontal) will register with the fixed mark 17. To the end of the balance lever 8 from which is suspended the larger float 5, is connected one end of a compensating chain 20 said chain rising upwardly to pass over the sprocket 21 which is fixed on the shaft 22. After passing over the sprocket 21 the chain 20 is suspended in proximity to but spaced from the float 5 as clearly shown in the drawings. Carried on the shaft 22 is a spiral scale 25 which carries the graduations 26 and which is revolved by the hand wheel 27. Supported by the brackets 30 is the shaft 31 which carries the pointer 32 which in turn has a pin (not shown) which engages the grooves 33 in the spiral scale 25, so that when the spiral scale 25 is revolved by the hand wheel 27 the pointer 32 will move from left to right and vice versa across the face of the spiral scale 25. Starting with the devices as shown in Fig. 1 and assuming the tank I to be empty and the parts in the position shown in Figs. 1 and 2, the floats 4 and 5 will assume the balanced position illustrated. If, however, there is a slight unbalancing it is obvious that by turning the hand wheel 27 to transfer some of the chain 20 over the sprocket 21 from a position in front of to a position behind the float 5, or vice versa, to increase or decrease the weight at the end of the balance lever 8 supporting the float 5, the floats 4 and 5 can be balanced and the indicator 16 can be made to register with the mark 17. When this is accomplished, with the tank 1 empty, the point at which the pointer 32 registers with the graduations 26 is marked 0 on the spiral scale 25. When liquid is introduced into the tank 1, the float 5 will, due to the differential buoyancy of the floats 4 and 5, tend to rise so that the balance lever 8 and the pointer 16 are unbalanced as shown in dotted lines in Fig. 1. In order to prevent the complete tilting or toppling over of the balance lever 8 I have provided the stops 35. When my device is applied to an uncharted or uncalibrated tank, it is necessary to calibrate my gauge specifically for such tank and this is accomplished as follows: a predetermined quantity of liquid, say 100 gallons (the amount used varying with the size of the tank) is introduced into the tank 1 and this results in upsetting the balance to a corresponding extent. The hand wheel 27 is then turned to transfer some of the chain 20 from in front of the float 5, as shown in Fig. 2, to a position behind the float 5 as shown in Fig. 3 (thus adding the weight of the portion of the chain transferred to the end of the lever 8 supporting the float 5) until the balance lever 8 is again horizontal and the pointer 16 is in registration with the mark 17. The turning of the hand wheel 27, by turning the spiral scale 25, results in advancing the pointer 32 from left to right with respect to the spiral scale 25, (it being understood that pointer 32 slides freely on the shaft 31) thus bringing one of the graduations 26 to register with the pointer 31. This point on the spiral scale 25 is then marked 100, and the graduations 26 on the spiral scale 25, intermediate the 0 point heretofore attained and the point marked 100, are marked accordingly. The process is repeated and additional markings are thus obtained until the tank is completely filled, the illustrations in Fig. 3 showing the tank almost completely filled. With the gauge properly calibrated to the tank in connection with which it is to be used, it is only necessary in order to determine the amount of liquid in the tank at any one time, merely to turn the hand wheel 27 and bring the pointer 16 into registration with the mark 17, and the reading of the pointer 32 on the graduations 26 will indicate the number of gallons or other units in the tank. In other words the length of chain necessary to be transferred over the sprocket 21, (to add its weight to the end of the lever 8 which carries the float 5) indicates the amount of liquid in the tank since the additional weight of the chain serves to compensate for the buoyancy differential of the floats 4 and 5, which in turn varies with the liquid pressure against the floats, which in turn varies with the height of the liquid within the tank.

In Figs. 5 to 7 I have shown the same gauge illustrated in connection with Figs. 1 to 4 applied to an overground tank, that is one of the large tanks ordinarily employed by oil companies for storage of very large quantities of oil, the object of the construction illustrated in Figs. 5 to 7 being to eliminate the necessity of climbing to the top of the tank whenever it is necessary to take a reading. To this end I employ the same floats 4 and 5, suspended into the tank from the balance bar 8, which balances on the knife edge 11 in the V slot 12, exactly as in Fig. 1. The knife-edge shaft 11 is extended forwardly as shown in Fig. 6 to over-hang the edge of the tank, and carries another balance bar 8X which also balances in a V 12X in the same manner as the balance bar 8. The balance bars 8 and 8X are also preferably interconnected by the arms 40 so that when the balance bar 8 is upset or tilted due to the buoyancy differential between the floats 4 and 5, the outer or auxiliary balance bar 8X will also be upset or tilted accordingly. Below the top of the tank, and in a position accessible from the ground 41, is positioned a third balance bar 8XX which is interconnected with the balance bar 8X by means of the rods or links 42. Thus the unbalancing of the floats 4 and 5, due to their buoyancy differential, results, in the last analysis, in the unbalancing of the balance bar 8XX, and the rebalancing of the bar 8XX, by manipulation of the hand wheel 27, and the transposition of the chain 20, will result in rebalancing the floats 4 and 5 within the tank, by remote control, and the position of the pointer 32 with respect to the graduations 26 on the spiral scale 25 will indicate the amount of liquid in the tank in exactly the same manner as set forth in connection with the operation of the gauge shown in Figs. 1 to 4.

It will thus be seen that by this arrangement the operator can measure the liquid contents of a large and high tank from the ground level and without climbing to the top of the tank, and that this result is achieved by positioning the pointer 16, the mark 17, the hand wheel 27, the spiral scale 25, and the chain 20 in a position accessible to the operator standing on the ground, and, by means of the balance bars 8XX, 8X, and 8, the unbalanced condition of the floats 4 and 5 is transmitted to the lower balance bar 8. Conversely the rebalancing of the lower bar 8XX and the pointer 16 results in giving a reading on the spiral scale 25 indicative of the initial unbalancing of the floats 4 and 5 in exactly the manner described in connection with the operation of the structure shown in Figs. 1 to 4.

It will thus be seen that according to my novel construction, I utilize the differential of buoyancy of the floats 4 and 5 as the factor with which the amount of liquid in the tank is ultimately determined, since the amount of weight to be added to the float having the greater buoyancy, represents the fluid pressure exerted on the floats, and hence, the amount of liquid in the tank.

While I have illustrated in the annexed drawings a form of construction which I have found satisfactory in practical use, it is to be understood that the drawings are illustrative and not delimitive to the invention, since it is within the scope of my invention to use other forms of floats or any devices that will possess and express a buoyancy differential, that I may use any desired counterweight in lieu of chain 20, that the elements possessing the buoyancy differential can be mounted in ways other than that illustrated, and that other means for rebalancing the float elements, and for translating their action into terms of measurement of the liquid contents may be employed, without in any way, changing the basic conception underlying my invention.

If desired, I may provide the spiral scale 25 with graduations 26, which read in volumetric units on linear units (feet or inches), or both, so as to render my gauge equally applicable to the measurements of liquids in different tanks, according to the units to which such tanks are calibrated. It is to be noted that, when my device is once calibrated, whether in terms of volumetric units, or in terms of linear units, to a standard tank of known capacity, it will not be necessary to calibrate my gauge over and over again to each and every tank to which it is to be applied. When my device is calibrated in terms of feet and inches, the height of liquid in any tank, regardless of the nature of the liquid, will produce exactly the same buoyancy differential and the reading on the spiral scale 25, when referred to the calibration chart of the particular tank, will indicate the amount of liquid in the tank.

Having thus described my invention, what I claim as new and desire to secure by Letters Patent is:

1. In a gauge of the character described, a balance arm, a pair of normally balanced floats, having different coefficients of buoyancy, suspended from said arm into the tank and adapted to be unbalanced by the liquid in the tank, equalizing means for compensating for the different buoyancies exerted upon said floats by said liquid, and calibrated means operable synchronously with said equalizing means for measuring said liquid.

2. In a gauge of the character described, a balance arm, a pair of normally balanced floats, having different coefficients of buoyancy, suspended from said arm into the tank and adapted to be unbalanced by the liquid in said tank, equalizing means for compensating for the different buoyancies exerted upon said floats by said liquid and rebalancing said floats and means operable simultaneously with said equalizing means for measuring the amount of compensation needed for the rebalancing of said floats in terms of the liquid content of said tank.

3. A gauge of the character described comprising an arm, a pair of normally balanced floats of equal weights but of different displacements suspended from said arm into a tank and adapted to be unbalanced by the liquid in said tank, an auxiliary balancing device, operatively connected to said arm, whereby the unbalancing of said floats is transmitted to said auxiliary balancing device, means for rebalancing said auxiliary balancing device and means for translating said rebalancing action into terms of measurement of said liquid.

4. A gauge of the character described comprising an arm, a pair of normally balanced floats of equal weights but of different displacements suspended from said balanced arm into a tank and adapted to be unbalanced by the liquid in said tank, an auxiliary balancing device operatively connected to said arm, whereby the unbalancing of said floats is transmitted to said auxiliary balancing device, a chain connected to the float having the greater buoyancy, means for rebalancing said balancing device by the gradual transfer of said chain onto said last mentioned float and means for translating the length of chain transferred onto said last mentioned float into terms of measurement of the liquid in said tank.

THOMAS M. EYNON.